United States Patent
Sato et al.

(10) Patent No.: US 6,779,098 B2
(45) Date of Patent: Aug. 17, 2004

(54) DATA PROCESSING DEVICE CAPABLE OF READING AND WRITING OF DOUBLE PRECISION DATA IN ONE CYCLE

(75) Inventors: Hisakazu Sato, Hyogo (JP); Isao Minematsu, Hyogo (JP)

(73) Assignee: Renesas Technology Corp., Tokyo (JP)

(*) Notice: Subject to any disclaimer, the term of this patent is extended or adjusted under 35 U.S.C. 154(b) by 153 days.

(21) Appl. No.: 09/995,835

(22) Filed: Nov. 29, 2001

(65) Prior Publication Data

US 2002/0099917 A1 Jul. 25, 2002

(30) Foreign Application Priority Data

Jan. 24, 2001 (JP) ........................................ 2001-015260

(51) Int. Cl.[7] .............................................. G06F 12/00
(52) U.S. Cl. ...................... 711/168; 711/200; 711/217; 711/218; 711/220; 710/26
(58) Field of Search ................................ 711/168, 200, 711/217, 218, 219, 220; 710/26

(56) References Cited

U.S. PATENT DOCUMENTS

| | | | | |
|---|---|---|---|---|
| 5,045,993 A | * | 9/1991 | Murakami et al. | 712/236 |
| 5,276,902 A | * | 1/1994 | Nakatani et al. | 712/6 |
| 5,918,253 A | * | 6/1999 | Kadowaki | 711/220 |
| 6,253,277 B1 | * | 6/2001 | Lakhani et al. | 711/5 |
| 6,405,273 B1 | * | 6/2002 | Fleck et al. | 710/305 |
| 6,434,690 B1 | * | 8/2002 | Ohsuga et al. | 712/35 |
| 6,463,518 B1 | * | 10/2002 | Duboc | 711/220 |
| 6,518,836 B2 | * | 2/2003 | Gau et al. | 329/341 |

FOREIGN PATENT DOCUMENTS

JP          5-100948          4/1993

OTHER PUBLICATIONS

"Reference Set vol. 1," Texas Instruments, TMS320C54x DSP CPU and Peripherals (1997), pp. 2-1—2-14.

* cited by examiner

*Primary Examiner*—Donald Sparks
*Assistant Examiner*—Ngoc V Dinh
(74) *Attorney, Agent, or Firm*—McDermott Will & Emery LLP

(57) ABSTRACT

A data processing device includes a memory system capable of a plurality of simultaneous accesses, a plurality of address generators each generating an address for accessing the memory system, an addressing register having a plurality of address registers, a data processing unit providing an operation process to the data read from the memory system, and a control unit controlling operations of the plurality of address generators and the data processing unit. The plurality of address generators can generate addresses from a common value in one address register to simultaneously read data designated by the generated addresses from the memory system.

16 Claims, 4 Drawing Sheets

DATA PROCESSING DEVICE CAPABLE OF READING AND WRITING OF DOUBLE PRECISION DATA IN ONE CYCLE

BACKGROUND OF THE INVENTION

1. Field of the Invention

The present invention relates to a data processing device, and more particularly, to a data processing device having a data processing unit that can simultaneously receive double precision data as an input.

2. Description of the Background Art

A data processing unit of a conventional 16-bit DSP (Digital Signal Processor) has a circuit as illustrated by the functional block diagram shown in FIG. 8, in order to precisely and efficiently execute a product-sum operation for 16-bit signed data. The data processing unit includes a multiplier 1001 multiplying 16-bit signed data with each other at every cycle; an adder-subtractor 1002 dedicated to the product-sum operation and capable of handling 40-bit data; an adder-subtractor 1003 dedicated to addition/subtraction and capable of handling 40-bit data; and accumulators 1004 and 1005 each storing 40-bit data.

Adder-subtractors 1002 and 1003, and accumulators 1004 and 1005 are designed to handle 40-bit data for securing sufficient process precision in the product-sum operation. The multiplication result of 16-bit data will be in a dynamic range of 32 bits, and the result obtained by accumulating the multiplication result will be in an even larger dynamic range.

The function of reading one data and one coefficient from a memory (not shown) per cycle is realized by a configuration including a plurality of independent buses such as PB (Program Bus), CB, DB and EB. The buses CB and DB are connected to the memory. The memory here may be a two-port memory or a memory to which two accesses can be executed in one cycle. Thus, the use of the buses CB and DB enables simultaneous reading of two pieces of data.

In the data processing unit of such a DSP, adder-subtractors 1002 and 1003 can handle 40-bit data, so that it is easy to perform addition/subtraction of double precision data (32-bit data) stored in the accumulators with each other. However, when the 32-bit data stored in the memory is used as an operand, a transfer path between the memory and adder-subtractors 1002 and 1003 is only for 16 bits. Thus, desired data stored in the memory cannot be supplied to adder-subtractors 1002 and 1003 in one cycle. Therefore, adder-subtractors 1002 and 1003 capable of handling 40 bits cannot be efficiently operated.

SUMMARY OF THE INVENTION

The present invention was made to solve the above problem, and an object of the present invention is to provide a data processing device capable of efficiently operating an adder/subtractor.

A data processing device according to an aspect of the present invention includes a memory system capable of a plurality of simultaneous accesses; a plurality of address generators connected to the memory system, each of which generating an address for accessing the memory system; an addressing register connected to the plurality of address generators and having a plurality of address registers; a data processing unit connected to the memory system and providing an operation process to data read from the memory system; and a control unit connected to the addressing register, the plurality of address generators and the data processing unit, and controlling operations of the plurality of address generators and the data processing unit; the plurality of address generators being capable of generating addresses from a common value in one address register of the plurality of address registers to simultaneously read data designated by the generated addresses from the memory system.

A plurality of addresses are generated by the plurality of address generators, and the same memory system is accessed. This allows reading and writing of double precision bit data in one cycle. Further, the addresses are generated based on the same addressing register. This allows reduction of the number of registers.

Preferably, a part or all of the plurality of address generators each include a next address calculating unit connected to the addressing register and performing calculation of a next address based on a value held in the addressing register; and an updating unit connected to the addressing register and to the next address calculating unit, and updating the value held in the addressing register based on a calculation result of the next address calculating unit.

Provision of the next address calculating unit and the updating unit allows simultaneous execution of address updating and data operation. As a result, the number of processing cycles can be reduced.

More preferably, the addressing register includes a selecting register designating any one of the plurality of address registers. The control unit directly designates by an instruction field an address register to be referred by an address generator of the plurality of address generators during register indirect addressing, and indirectly designates by the instruction field an address register to be referred by another address register, based on a value stored in the selecting register.

By designating the operation information of an address generator using the register indirect addressing, the instruction field can be saved.

More preferably, each of the plurality of address generators selects an updating method in accordance with a predetermined precedence when the plurality of address generators have different methods of updating addresses.

For example, the operation contents that were directly designated in the instruction field can have a precedence. This eliminates the needs for rewriting of the contents of a mode register.

More preferably, the data processing unit includes an adder-subtractor having first and second input ports having a bit width of at least (N+M) bits, N being a bit size of a memory access port accessed by the register indirect addressing and M being a bit size of another memory access port accessed by the register indirect addressing, and receiving data of (N+M) bits read from the one memory access port and the another memory access port and connected together at at least one of the first and second input ports.

By combining the data read from the two memory access ports to configure a numeric value, the number of processing cycles for addition/subtraction with double precision can be reduced.

More preferably, data processing unit further includes an accumulator capable of storing data having a bit length of at least (N+M) bits. The control unit stores into the accumulator the data of (N+M) bits read from the one memory access port and the another memory access port and connected together.

More preferably, a part or all of the plurality of address generators each includes a first register holding a start address, and a second register holding an end address. The control unit performs modulo addressing based on values held in the first and second registers.

Further preferably, a part or all of said plurality of address generators each include at least one reference register holding a reference value and is capable of selectively outputting, as an address, a first value stored in one of the plurality of addressing registers as it is and a second value, which is an operation result of an operation on the first value and a value stored in at least one reference register.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Entire Configuration

Figure 1:
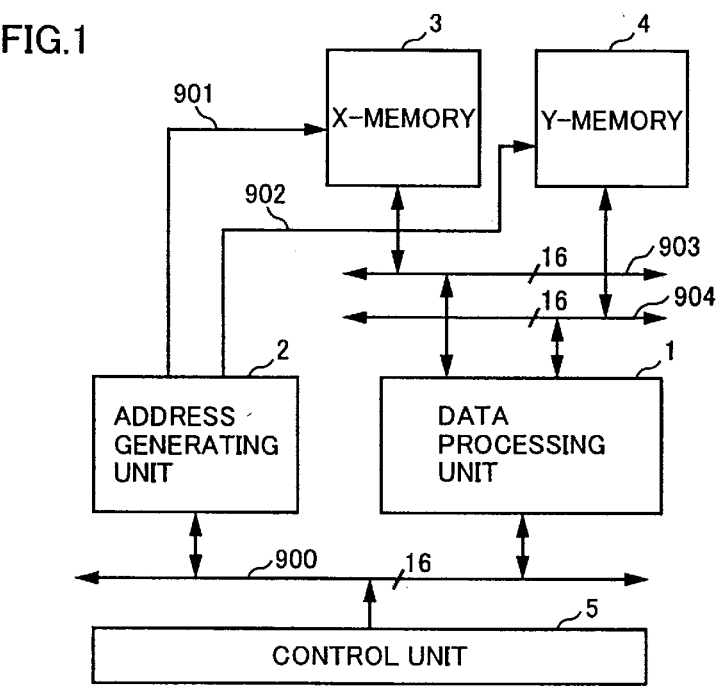
FIG. 1 is a block diagram showing a configuration of a data processing device according to an embodiment of the present invention.

Referring to FIG. 1, a data processing device according to an embodiment of the present invention includes a data processing unit 1 executing processes such as addition/subtraction; an X-memory 3 and a Y-memory 4 storing, respectively, data to be processed and a result processed by data processing unit 1; an address generating unit 2 supplying an address to each of X-memory 3 and Y-memory 4, and a control unit 5 successively reading instruction codes and decoding the codes to control all the operations of the other functional blocks.

The data processing device further includes a data bus 900 interconnecting data processing unit 1, address generating unit 2 and control unit 5, and used for data transfer between registers in units and for control unit 5 to assign a value to a specified register; an address bus 901 connected to X-memory 3 and address generating unit 2 and used for supplying an address to X-memory 3; and an address bus 902 connected to Y-memory 4 and to address generating unit 2 and used for supplying an address to Y-memory 4.

The data processing device further includes a memory bus 903 interconnecting X-memory 3 and data processing unit 1 and used for reading/writing data from/into X-memory 3; and a memory bus 904 interconnecting Y-memory 4 and data processing unit 1 and used for reading/writing data from/into Y-memory 4.

Though X-memory 3 and Y-memory 4 are herein shown as physically different memories, it is understood that a type of a memory that can simultaneously execute two accesses, i.e. a so-called 2-port memory, may be used to realize, by one memory, the same memory system as in the case with two memories.

Configuration of Data Processing Unit 1

Figure 2:
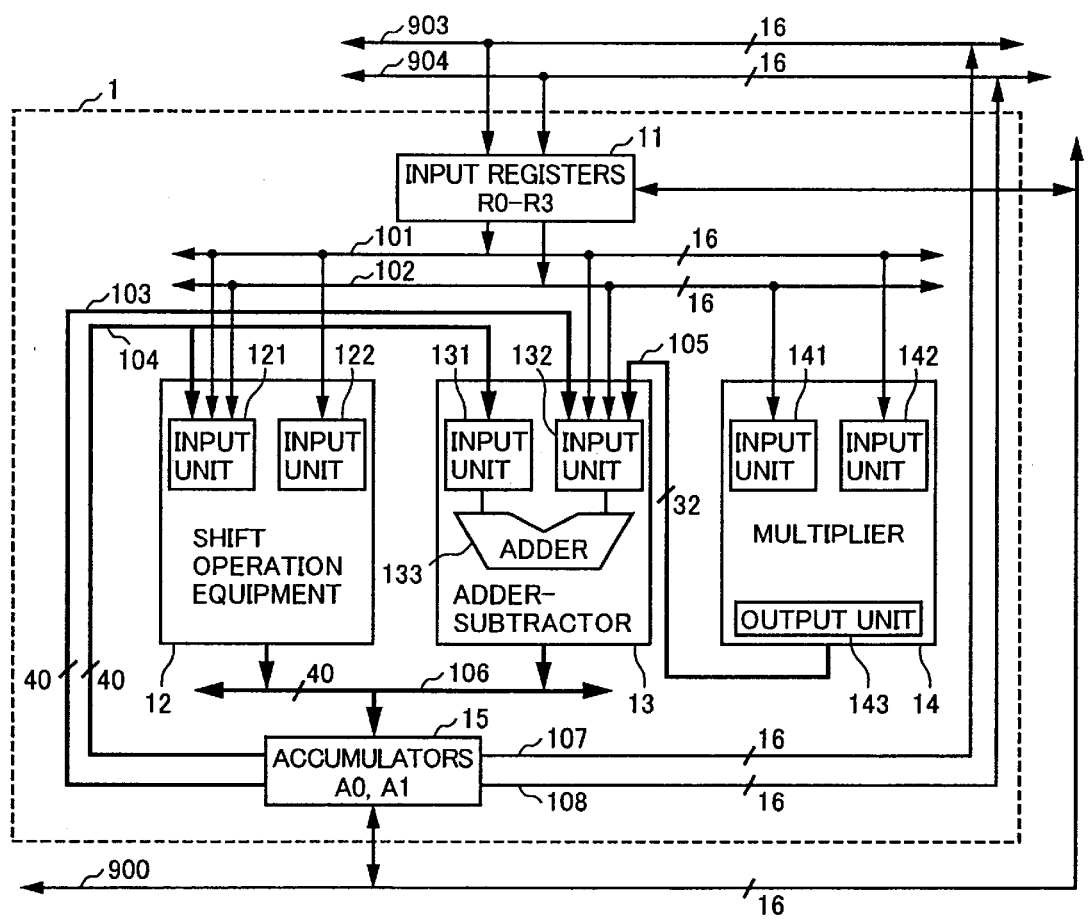
FIG. 2 is a block diagram showing a configuration of the data processing unit.

Referring to FIG. 2, data processing unit 1 includes an input register 11; a shift operation equipment 12; an adder-subtractor 13; a multiplier 14; an accumulator 15 storing an operation result from shift operation equipment 12 or adder-subtractor 13 and having 40-bit data registers A0 and A1; 16-bit data buses 101 and 102 interconnected to input register 11, shift operation equipment 12, adder-subtractor 13 and multiplier 14 for supplying data stored in input register 11 to each operation equipment; 40-bit data bus 103 connected to accumulator 15 and adder-subtractor 13 for supplying data stored in accumulator 15 to adder-subtractor 13; and a 40-bit data bus 104 interconnecting accumulator 15, shift operation equipment 12 and adder-subtractor 13, for supplying data stored in accumulator 15 to shift operation equipment 12 or to adder-subtractor 13.

Data processing unit 1 further includes a 32-bit data bus 105 connected to adder-subtractor 13 and multiplier 14 for supplying a multiplication result from multiplier 14 to adder-subtractor 13; a 40-bit data bus 106 interconnecting shift operation equipment 12, adder-subtractor 13 and accumulator 15 for storing an operation result from shift operation equipment 12 or adder-subtractor 13 into accumulator 15; a 16-bit data bus 107 connected to accumulator 15 and memory bus 903 for outputting data stored in accumulator 15 to memory bus 903; and a 16-bit data bus 108 connected to accumulator 15 and memory bus 904 for outputting data stored in accumulator 15 to memory bus 904.

Though not shown in FIG. 2, a tristate driver is arranged between data bus 107 and memory bus 903, and between data bus 108 and memory bus 904. The value on data bus 107 or 108 is output to memory bus 903 or 904, respectively, only as required.

In addition, data processing unit 1 includes a logic operation equipment for performing logical operation, a comparator for performing comparison operation, a zero discrimination equipment, a saturation operation equipment and a rounding operation equipment. However, those are not directly related to the present invention and therefore are not shown in the drawings for the purpose of simplified description and drawings.

Figure 3:
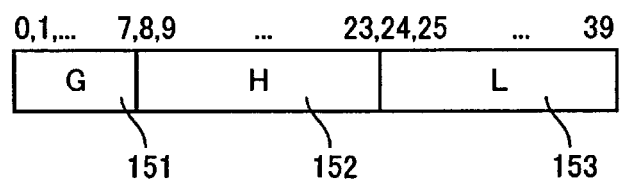
FIG. 3 illustrates names of each field in 40-bit data.

The name of each field in 40-bit data is defined here to make it easier to understand the description below. As shown in FIG. 3, the 40-bit data is divided into three fields, in which the most significant 8 bits are referred to as G field, the next 16 bits are referred to as H field, and the least significant 16 bits are referred to as L field.

Input register 11 is a register file containing four 16-bit data registers R0 to R3, holding the data read from X-memory 3 and Y-memory 4 into these registers while supplying values held in the registers to each operation equipment via data bus 101 or 102.

Input register 11 includes five input/output ports as follows:

two 16-bit input ports connected to memory buses 903 and 904 respectively;

two 16-bit output ports connected to data buses 101 and 102 respectively; and a 16-bit input/output port connected to data bus 900.

The first four ports can operate independently, so that inputting of two pieces of 16-bit data and outputting of two pieces of 16-bit data can be performed simultaneously. For example, in a cycle, data in data registers R0 and R1 can be output to data buses 101 and 102 respectively, and the data read from X-memory 3 and Y-memory 4 can be stored into data registers R2 and R3, respectively, at the end of the cycle. Alternatively, data in data registers R0 and R1 can be output to data buses 101 and 102 respectively, while being updated by the data read from X-memory 3 and Y-memory 4 at the end of the cycle.

Accumulator 15 includes input/output ports as follows:

a 40-bit input port connected to data bus 106;

two 40-bit output ports connected to data buses 103 and 104 respectively;

two 16-bit output ports connected to data buses 107 and 108 respectively; and a 16-bit input/output port connected to data bus 900.

Each of the output ports connected to data buses 103 and 104, and the input port connected to data bus 106 can be operated independently. For example, the data in data registers A0 and A1 can be output to data buses 103 and 104 respectively, and the data supplied by data bus 106 can be stored into data register A1 at the end of the cycle.

Accumulator 15 can output any one of G, H, L fields in data registers A0 and A1 to data bus 107 or 108. Accumulator 15 can also output two of the six fields to the two data buses, respectively, at once. For example, H field in data register A0 may be output to data bus 107, and L field in data register A0 may be output to data bus 108. Further, as for outputting of G field, the higher 8 bits are sign extended. That is, G field is arranged at the right end of the 16-bit data to be output onto a bus, and the remaining higher 8 bits are provided with the same value as MSB (Most Significant Bit) of the original data in the data register.

Accumulator 15 may output any one of G, H, L fields in each of data registers A0 and A1 to data bus 900 or may store the data on data bus 900 into any one of the six fields described above, via a port connected to data bus 900 between units. When the data in G field is output onto data bus 900, the higher 8 bits are sign extended, and when the data on data bus 900 is stored into G field, the higher 8 bits are lost.

Shift operation equipment 12 executes any of the processes of signed right-shift, unsigned right-shift and left shift. The maximum shift amount is 16 bits. Shift operation equipment 12 includes an input unit 121 connected to data buses 101, 102 and 104, and an input unit 122 connected to data bus 101.

Input unit 121 generates the first source operand (shift data) based on the data provided from any of data buses 101, 102 and 104. The method of generating the shift data is any of the methods described below.

The data on data bus 104 is arranged in G, H, L fields as it is.

The data on data bus 101 is arranged in H field, and zero is inserted into L field. G field is sign extended.

The data on data bus 101 is arranged in H field, the data on data bus 102 is arranged in L field, and G field is sign extended.

Input unit 122 generates the second source operand (shift amount). This may be data provided by data bus 101, or may be zero. The operand generated at these two input units are processed by the shifter body (not shown), and the shifted result is stored into accumulator 15 via data bus 106.

Adder-subtractor 13 includes an input unit 131 connected to data bus 104; an input unit 132 connected to data buses 103, 101, 102 and 105; and an adder 133 connected to input units 131 and 132.

Adder 133 performs signed addition/subtraction for the data of 40-bit width. Input unit 131 selects the data provided by data bus 104 or zero to generate the first source operand.

Input unit 132 generates the second source operand from data provided by data bus 101, 102, 103 or 105. In operand generation, first, source selection and sign extension is performed as will be described below, and, thereafter, if subtraction is executed, all bits are inverted.

The data on bus 103 is arranged in G, H, L fields as it is.

The data on bus 103 is arithmetic right-shifted by 16 bits and arranged in G, H, L fields.

The data on data bus 101 is arranged in H field, the data on data bus 102 is arranged in L field, and G field is sign extended.

The data on data bus 101 is arranged in H field, and zero is inserted into H field. G field is sign extended.

The data on data bus 105 is arranged in H field and L field, and G field is sign extended.

The data on data bus 105 is arranged in H field and L field, and G field is zero extended.

Adder 133 performs addition of two source operands to each other, which are generated as described above. In subtraction, a carry is provided to the least significant bit. That is, 1 is provided to the least significant bit as a carry input. The result of the addition is output onto data bus 106, and thereafter is stored into accumulator 15.

Multiplier 14 includes an input unit 141 connected to data bus 102, an input unit 142 connected to data bus 101, a multiplication array unit (not shown), and an output unit 143. Multiplier 14 receives signed or unsigned 16-bit data as an input, and outputs signed or unsigned 32-bit data as a multiplication result. In accordance with whether the data supplied from data bus 102 and 101 is signed or unsigned, input units 141 and 142, respectively, provide the data with necessary pre-processes, and provide the data to the multiplication array unit. The multiplication array unit performs multiplication of these two pieces of data. Output unit 143 performs a process with two stages for the multiplication result of the multiplication array unit. In the first stage, the multiplication result is left-shifted by 1 bit as required. In the second stage, the output of the first stage is arithmetic right-shifted by 16 bits, or is left-shifted by 16 bits, or is left without any process provided thereto. When the process to the data at output unit 143 is completed, the data is output onto data bus 105.

Configuration of Address Generating Unit

Next, the configuration of address generating unit 2 will be described in detail.

Figure 4:
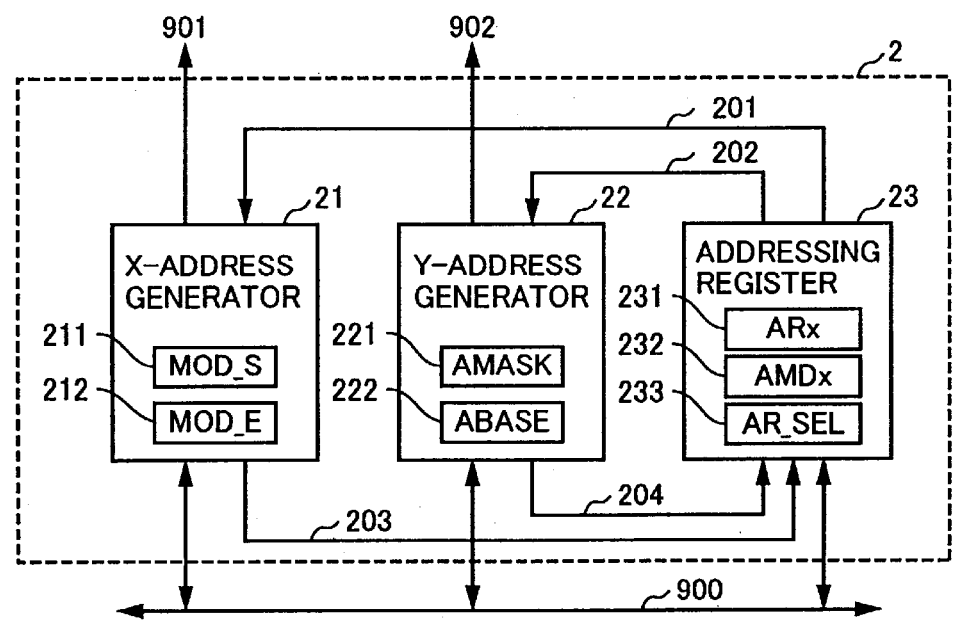
FIG. 4 is a block diagram showing a configuration of an address generating unit.

Referring to FIG. 4, address generating unit 2 includes an X-address generator 21, a Y-address generator 22, an addressing register 23, an address information bus 201 connecting addressing register 23 and X-address generator 21, an address information bus 202 connecting addressing register 23 and Y-address generator 22, an address information bus 203 connecting X-address generator 21 and addressing register 23, and an address information bus 204 connecting Y-address generator 22 and addressing register 23.

Address information buses 201 and 202 provide data to X-address generator 21 and Y-address generator 22 respectively, and address information buses 203 and 204 are next address buses providing data from X-address generator 21 and Y-address generator 22, respectively, to addressing register 23.

Addressing register 23 holds information for register indirect addressing, and supplies the information to X-address generator 21 or to Y-address generator 22. Addressing register 23 includes an address register 231, a mode register 232 and a cluster selecting register (AR_SEL) 233.

Address register 231 includes four registers AR0 to AR3, and holds an address for register indirect addressing. Mode register 232 also includes four registers AMD0 to AMD3, and holds additional information for calculating a next address at the time of register indirect addressing. Mode register 232 holds an addition value to be added to address register 231 after accessing to a memory, necessity/no-necessity of modulo addressing at the time of accessing to X-memory 3, and necessity/no-necessity of an address mask at the time of accessing to Y-memory 4.

The modulo addressing is an addressing in which, if accessing to a memory performed together with addition (or subtraction) of addresses reaches a specified address (end address), the accessing returns to a predetermined initial address (start address).

Address register 231 and mode register 232 are herein collectively referred to as a "cluster." For example, the combination of registers AR0 and AMD0 is "cluster 0," and the combination of register AR1 and AMD1 is "cluster 1."

Addressing register 23 selectively reads a cluster in accordance with the instruction by control unit 5, and outputs the selected cluster onto address information bus 201 or 202. Moreover, if addressing register 23 receives a next address from address information bus 203 or 204, addressing register 23 stores the next address into address register 231 of the read cluster. AR_SEL 233 is a pointer for selecting a cluster of Y-address generator 22. When the cluster selection via a pointer is instructed by control unit 5, the information of the cluster indicated by AR_SEL 233 is supplied onto address information bus 202.

Figure 5:
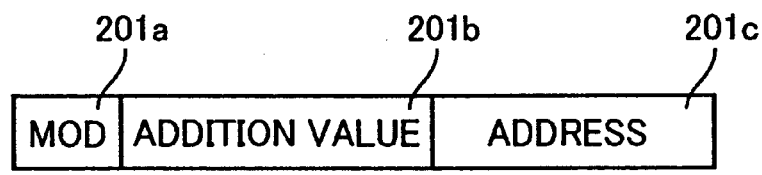
FIGS. 5 and 6 show the contents of data included in an address information bus.

FIG. 5 shows the contents of data flowing on address information bus 201. Both an MOD field 201a and an addition value field 201b are the information stored in mode register 232, indicating necessity/no-necessity of the modulo addressing, and the addition value at the calculation of the next address. Address field 201c is address information stored in address register 231.

Figure 6:
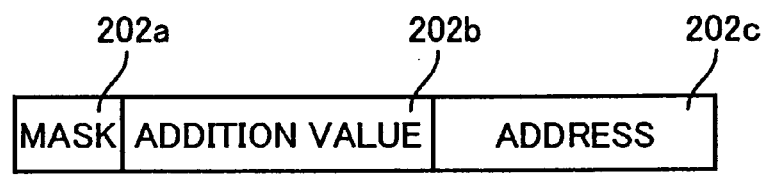

FIG. 6 shows the contents of data flowing on address information bus 202. Both an MASK field 202a and an addition value field 202b are the information stored in mode register 232, indicating necessity/no-necessity of the mask addressing, and the addition value at the calculation of the next address. Address field 202c is address information stored in address register 231.

Here, the mask addressing is an addressing in which a value of specified bits is fixed to a specified value. An example of the mask addressing fixes higher bits, excluding the lower 8 bits of an address, to zero. In such a case, a circular buffer of 256 words is realized.

X-address generator 21 generates an address for accessing X-memory 3, and, if required, executes calculation of an address for the next access, in accordance with the information provided by control unit 5. X-address generator 21 includes an adder (not shown) for executing calculation of the next address, a modulo start address register (MOD_S) 211, and a modulo end address register (MOD_E) 212.

The manner of generating an address includes immediate addressing and register indirect addressing. In the immediate addressing, immediate data provided by control unit 5 is directly output as an address for X-memory 3.

In the register indirect addressing, address field 201c is output as an address for X-memory 3 while the next address is found, which is to be output onto address information bus 203. The next address can be found as described below.

(1) When MOD field 201a indicates no modulo addressing, next address=address field 201c+addition value field 201b.

(2) When MOD field 201a indicates the modulo addressing,
   (a) if address field 201c is unequal to MOD_E 212, next address=address field 201c+addition value field 201b; and
   (b) if address field 201c is equal to MOD_E 212, next address=MOD_S 211.

Y-address generator 22 generates an address for accessing Y-memory 4 and, if required, executes calculation of an address for the next access, in accordance with information provided by control unit 5. Y-address generator 22 includes an adder (not shown) for the calculation of the next address, a mask field register (AMASK) 221 for mask addressing, and a base address register (ABASE) 222.

The manner of generating an address includes immediate addressing and register indirect addressing. In the immediate addressing, immediate data provided by control unit 5 is output directly as an address for Y-memory 4.

The address for Y-memory 4 output onto address bus 902 during the register indirect addressing is generated as described below.

(1) When MASK field 202a indicates no mask addressing, Y-memory address=address field 202c.

(2) When MASK field 202a indicates the mask addressing (here, "&" denotes a logical product per bit, "|" denotes a logical sum per bit, and "~" denotes an inversion per bit), $TMP1=$(address field $202c$)$\&\sim$(AMASK221), $TMP2=$(ABASE222)$\&$(AMASK221), and Y-memory address=$TMP1|TMP2$.

Here, TMP1 and TMP2 indicate registers (not shown) holding temporary values.

Moreover, the next address output onto address information bus 204 can be obtained as indicated below.

next address=address field 202c+addition value field 202b

Contents of Instructions

The instructions executed by the present data processing device includes:
   a sequence control instruction controlling an instruction sequence such as a jump or a loop:
   a transfer instruction transferring between registers, or between a register and a memory, and setting an immediate value to a register; and
   an operation instruction performing arithmetic operation such as multiplication or addition/subtraction, logical operation, shift operation or comparison operation.

Figure 7:
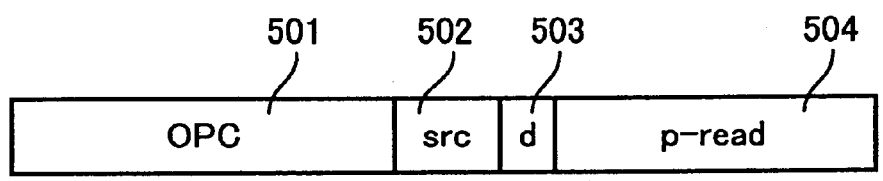
FIG. 7 shows a format of an operation instruction.
Figure 8:
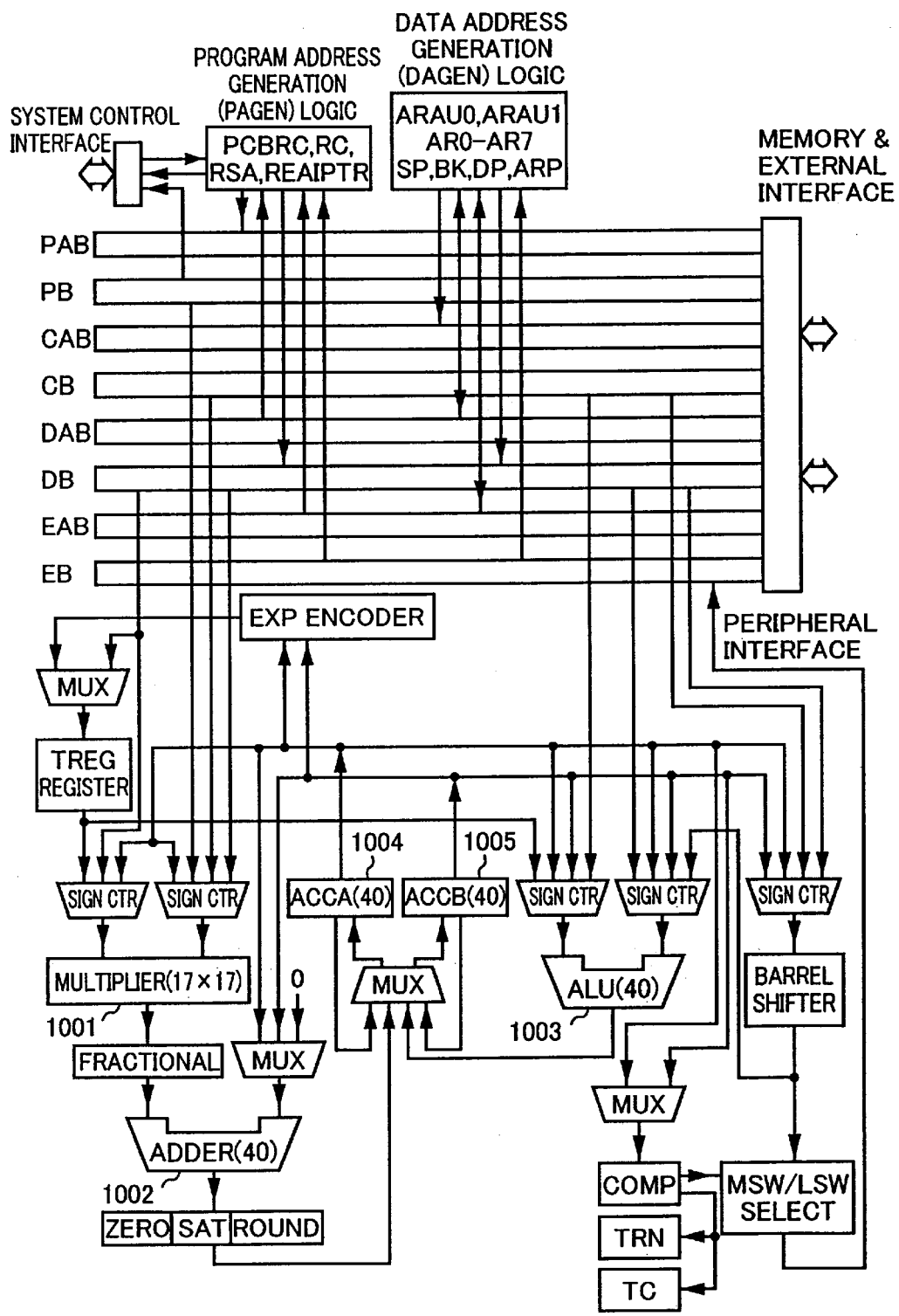
FIG. 8 is a block diagram showing an example of a data processing unit in a conventional 16-bit DSP.

The operations of some of the operation instructions described by the instruction codes to be decoded will be described below. FIG. 7 shows a format of an operation instruction, which is constituted by an OPC field 501 indicating the contents of the operation, a src field 502 indicating a source operand of the operation, a d field 503 indicating a destination of the operation, and a p-read field 504 indicating the content of data transfer performed in parallel with the execution of the operation (hereinafter referred to as "parallel read"). In the instruction designating three operands, the OPC field has 6 bits, the src field has 3 bits, and the d field has 1 bit. In the other instructions, the OPC field has 7 bits, the src field has 2 bits, and the d field has 1 bit. In either case, the p-read field has 6 bits.

TRFH Ax, Ry

The value of Ry is transferred to H field of Ax, and G field is sign extended. Zero is inserted into L field. For Ax, data register A0 or A1 can be designated, and any one of data registers R0 to R3 can be designated for Ry. Shift operation equipment 12 in which the shift amount is set to be 0 is used for the transfer path.

TRF Ax, Ry, Rz

In Ax, the value of Ry is transferred to H field, the value of Rz is transferred to L field, and G field is sign extended. Data register A0 or A1 can be designated for Ax, and (R0, R1) or (R2, R3) can be designated for (Ry, Rz). Shift operation equipment 12 in which the shift amount is set to be 0 is used for the transmission path.

ADD2 Ax, Ry, Rz

Rz is arranged in L field whereas Ry is arranged in H field, and the data resulting from the sign extension of G field is added to Ax, the result thereof being stored into Ax. Data register A0 or A1 can be designated for Ax, and (R0, R1) or (R2, R3) can be designated for (Ry, Rz).

SUB2 Ax, Ry, Rz

Rz is arranged in L field whereas Ry is arranged in H field, and the data sign extended from G field is subtracted from Ax, the result thereof being stored into Ax. Data register A0 or A1 can be designated for Ax, and (R0, R1) or (R2, R3) can be designated for (Ry, Rz).

MUL Ax, Ry, Rz

Ry and Rz are subjected to a signed multiplication, and the multiplication result is sign extended to be stored into Ax. Data register A0 or A1 can be designated for Ax, and any one of (R0, R0), (R0, R1), (R0, R2), (R0, R3), (R1, R2), (R1, R3), (R2, R1) and (R2, R3) can be designated for (Ry, Rz).

MAC Ax, Ry, Rz

Ry and Rz are subjected to a signed multiplication, and the multiplication result is sign extended, and thereafter Ax is added thereto, to be stored into Ax. Data register A0 or A1 can be designated for Ax, and any one of (R0, R0), (R0, R1), (R0, R2), (R0, R3), (R1, R2), (R1, R3), (R2, R1) and (R2, R3) can be designated for (Ry, Rz).

MACSUH Ax, Ry, Rz

Ry as a signed number and Rz as an unsigned number are multiplied together, and the multiplication result is left-shifted by 16 bits, and then is zero extended to be added to Ax, the result thereof being stored into Ax. Data register A0 or A1 can be designated for Ax, and any one of (R0, R0), (R0, R1), (R0, R2), (R0, R3), (R1, R2), (R1, R3), (R2, R1) and (R2, R3) can be designated for (Ry, Rz).

MACSUL Ax, Ry, Rz

Ry as a signed number and Rz as an unsigned number are multiplied together, and the multiplication result is arithmetic right-shifted by 16 bits, which is thereafter sign extended to be added to Ax, the result thereof being stored into Ax. Data register A0 or A1 can be designated for Ax, and any one of (R0, R0), (R0, R1), (R0, R2), (R0, R3), (R1, R2), (R1, R3), (R2, R1) and (R2, R3) can be designated for (Ry, Rz).

MACUU Ax, Ry, Rz

Ry and Rz as unsigned numbers are multiplied together, and the multiplication result is zero extended to be added to Ax, the result thereof being stored into Ax. Data register A0 or A1 can be designated for Ax, and any one of (R0, R0), (R0, R1), (R0, R2), (R0, R3), (R1, R2), (R1, R3), (R2, R1) and (R2, R3) can be designated for (Ry, Rz).

ADD Ax, Ry

Ry is arranged in H field, G field is sign extended, and zero is inserted into L field, and the resulting data is added to Ax, to be stored into Ax. Data register A0 or A1 can be designated for Ax, and data registers R0, R1, R2 or R3 can be designated for Ry.

SUB Ax, Ry

Ry is arranged in H field, G field is sign extended, and zero is inserted into L field, and the resulting data is subtracted from Ax, to be stored into Ax. Data register A0 or A1 can be designated for Ax, and data register R0, R1, R2 or R3 can be designated for Ry.

AADD Ax, Ay

Ax and Ay are added together, and the result thereof is stored into Ax. Data register A0 or A1 can be designated for Ax, and data register A0 or A1 can be designated for Ay.

ASUB Ax, Ay

Ay is subtracted from Ax, and the result thereof is stored into Ax. Data register A0 or A1 can be designated for Ax, and data register A0 or A1 can be designated for Ay.

SADD Ax, Ay

Ay is arithmetic right-shifted by 16 bits, and the shifted result is subtracted from Ax, and the result thereof is stored into Ax. Data register A0 or A1 can be designated for Ax, and data register A0 or A1 can be designated for Ay.

Transfer patterns described below are possible in the parallel read using p-read field 504. An example of an NOP instruction that re-writes no value in a register is herein described to explain a mnemonic.

No transfer (NOP)

When p-read [0:5]=00xx0x, no parallel read is carried out. The "x" here indicates an arbitrary value.

Accumulator read (NOP Rd←As)

When p-read [0:5]=00xx1x, the data in H field and L field of accumulator 15 is transferred to two data registers within input register 11. Input register 11 is indicated by p-read [2:3], and the source accumulator is indicated by p-read [5].

p-read [2:3]=00: data registers R0 and R1
    10: data registers R2 and R3
p-read [5]=0: data register A0
    1: data register A1

For example, when p-read [2:3]=00 and p-read [5]=1, H field in data register A1 is transferred to data register R0, and L field in data register A1 is transferred to R1.

X-memory read (NOP Rd, X: ARx (+))

When p-read [0:5]=01xxxx, X-memory 3 is read by the register indirect addressing. The read data is stored into a data register, indicated by p-read [2], within input register 11. A cluster number during addressing is indicated by p-read [4:5], and p-read [3] indicates whether or not calculation of the next address is executed. When "+" is added after ARx, the calculation of the next address is executed.

p-read [2]=0: data register R0
    1: data register R2
p-read [3]=0: calculation of the next address
    1: no calculation of the next address
p-read [4:5]=00: cluster 0
    01: cluster 1
    10: cluster 2
    11: cluster 3

Y-memory read (NOP Rd, Y: ARx (+))

When p-read [0:5]=10xxxx, data is read from Y-memory 4 by the register indirect addressing. The read data is input into a data register within input register 11 indicated by p-read [2]. The cluster number during the addressing is indicated by p-read [4:5], and p-read [3] indicates whether or not the calculation of the next address is executed. When "+" is added after ARx, the calculation of the next address is executed.

p-read [2]=0: data register R0
    1: data register R2
p-read [3]=0: calculation of the next address
    1: no calculation of the next address
p-read [4:5]=00: cluster 0
    01: cluster 1
    10: cluster 2
    11: cluster 3

X/Y-memory read (NOP Rd, X:ARx, Rd, Y:AR)

When p-read [0:5]=11xxxx, the data from both X-memory 3 and Y-memory 4 are read by the register indirect addressing. The read data is stored into input register 11 indicated by p-read [2]. The cluster number during X-memory addressing is indicated by p-read [4:5], and p-read [3] indicates whether or not calculation of the next address is executed. The cluster number during the Y-memory addressing is indicated by AR_SEL 233. X-memory 3 and Y-memory 4 can designate the same cluster, in which case, the designation by X-memory 3 side can have a precedence for determining whether or not calculation of the next address is executed.

p-read [2]=0: Store the data in X-memory 3 into data register R0, and the data in Y-memory 4 into data register R1.
        1: Store the data in X-memory 3 into data register R2, and the data in Y-memory 4 into data register R3.
    p-read [3]=0: calculation of the next address
        1: no calculation of the next address
    p-read [4:5]=00: cluster 0
        01: cluster 1
        10: cluster 2
        11: cluster 3

In the above example, indirect designation via AR_SEL 233 is used to designate the cluster number of Y-memory addressing and to designate whether or not the calculation of the next address is required. This is to keep the number of bits in an instruction code to be small. It is understood that, if there is an enough space for the required number of bits in the instruction code, the designations described above can be carried out within the instruction. For example, the p-read field may be extended by 3 bits, to control calculation of the next address and accessing to Y-memory 4, as described below.

p-read [6]=0: calculation of the next address after accessing to Y-memory
        1: no calculation of the next address after accessing to Y-memory
    p-read [7:8]=00: Access Y-memory 4 by cluster 0.
        01: Access Y-memory 4 by cluster 1.
        10: Access Y-memory 4 by cluster 2.
        11: Access Y-memory 4 by cluster 3.

Next, an example of the transfer instruction is described below.

ST Ra, MEMb: ARc(+)

The data indicated by Ra is written into MEMb by the indirect addressing using ARc. When "+" is added after ARc, calculation of the next address is executed. H field or L field of data register A0 or A1 can be designated for Ra. X-memory 3 or Y-memory 4 can be designated for MEMb. Any one of registers AR0 to AR3 can be designated for ARc.

ST Ra, X: ARb(+), Rc, Y: ARd(+)

The data in Ra is written into X-memory 3 by the indirect addressing using ARb, and the data in Rc is written into Y-memory 4 by the indirect addressing using ARd. When "+" is added after ARb and ARd, calculation of the next address is executed for each of them. H field or L field of data register A0 or A1 can be designated for Ra and Rc. Any one of AR0 to AR3 can be designated for each of ARb and ARd. The same cluster can be designated for X-memory 3 and Y-memory 4, in which case, designation by X-memory 3 side can have a precedence for determining whether or not calculation of the next address is required.

LD Ra, X: ARb(+), Rc, Y: ARd(+)

Reading of in X-memory 3 is executed by the indirect addressing using ARb, and the read data is stored into Ra, whereas reading of Y-memory 4 is executed by the indirect addressing using ARd, and the read data is stored into Rc. When "+" is added after ARb and ARd, calculation of the next address is executed for each of them. Any one of data registers R0 to R3 can be designated for each of Ra and Rc. However, the same register cannot be designated for both of the above. Any one of AR0 to AR3 can be designated for ARb and ARd.

Description of Operation and Effects

In the present data processing device, it is extremely easy to handle data of 16-bit precision. An example where data A in X-memory 3 and data B in Y-memory 4 are added together and the addition result C is stored into X-memory 3 will be described as below. Here, it is assumed that the addresses of data A, B and C are preset to registers AR0, AR1, and AR2, respectively.

*NOP R0, X: AR0+*

*TRFH A0, R0 R1, Y: AR1+*

*ADD A0, R1*

*ST A0H, X: AR2+*

Further, the mnemonics in the case where data A in X-memory 3 and data B in Y-memory 4 are multiplied together are as follows.

*NOP R0, X: AR0+, R1, Y: AR1+*

*MUL A0, R0, R1*

Furthermore, the multiplication result of two 16-bit data will have a precision of 32 bits. In such a case, the conventional device would require two cycles as indicated below in order to store the above-described multiplication result into X-memory 3.

*ST A0H, X: AR2+*

*ST A0H, X: AR2+*

However, in the present data processing device, if the higher 16 bits of the 32-bit data is associated with X-memory 3 and the lower 16 bits thereof is associated with Y-memory 4, the 32-bit data can be stored into a memory in one cycle as indicated below.

*ST A0H, X: AR2+, A0L, X: AR2+*

As described above, the method of storing the higher 16 bits into X-memory 3 and the lower 16 bits into Y-memory 4 is also efficient when addition of 32-bit data is executed. An example where 32-bit data A in a memory and 32-bit data B in the same memory are added together and the addition result C is re-stored into the memory, may be described as below. Here, it is assumed that AR_SEL 233 is set to designate register AR1.

LD R0, X: AR0+, R1, Y: AR0+

TRF A0, R0, R1, R0, X: AR1+, R1, Y: AR

ADD2 A0, R0, R1

ST A0H, X: AR2+, A0L, Y: AR2+

Another effect can be attained by combining accessing two memories by one address register with mask addressing using AMASK 221 and ABASE 222. For example, such an effect can be attained when a predetermined coefficient is multiplied by each coordinate of X in a two-dimensional array having a size in the X direction of the n-th power of 2, i.e. when a vertical column on a screen is cut out. Assuming that the size of the array is (X, Y)=(32, 8), the two-dimensional array is arranged at addresses of 0 to 255 in X-memory 3, and the coefficient to be multiplied thereto is arranged at the addresses of 0 to 31 in Y-memory 4. Here, each register is set as follows.

AMASK=0xffe0

ABASE=0x0000

AR0=0x0000

AMD0:Addition value=1, execute Y-memory mask addressing.

It is appropriate to execute the process described below in this state. This method is advantageous in that only 32 words are required as a coefficient region, and that an address register can be shared for the data and the coefficient, resulting in saving of a resource. Moreover, it is understood that the coefficient can be stored in an address other than zero if ABASE is set to be a different value.

NOP R0, X: AR0+, R1, Y: AR0+              (1)

MUL A0, R0, R1 R0, X: AR0+, R1, Y: AR0+   (2)

ST A0H, X: AR1+                           (3)

Thereafter, the processes of (2) and (3) are repeated 256 times in total.

Though mask addressing using two registers of AMASK and ABASE was described here, it is also possible to eliminate one or both of the registers and to employ a predetermined fixed value.

Furthermore, though the configuration was shown in which the modulo addressing is only realized in X-address generator 21 and the mask addressing is only realized in Y-address generator 22, it is also easy to realize these addressings in both of the address generators. To allow this, MOD_S, MOD_E, AMASK and ABASE are set such that they can be referred from the both address generators, and address information buses may be extended by 1 bit to instruct the contents of addressings.

According to the present embodiment, addresses are generated by two address generators, and two memory systems are simultaneously accessed. Thus, the bit data of double precision can be read and written in one cycle. Therefore, adder-subtractors can efficiently be operated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing device, comprising:

a memory system capable of a plurality of simultaneous accesses;

a plurality of address generators connected to said memory system, each of the plurality of address generators generating an address for accessing said memory system;

an addressing register connected to said plurality of address generators and having a plurality of address registers;

a data processing unit connected to said memory system and providing an operation process to data read from said memory system; and a control unit connected to said addressing register, said plurality of address generators and said data processing unit, and controlling operations of said plurality of address generators and said data processing unit;

said plurality of address generators being capable of generating addresses from a common value in one address register of said plurality of address registers to simultaneously read data designated by the generated addresses from said memory system.

2. The data processing device according to claim 1, wherein a part or all of said plurality of address generators each includes a next address calculating unit connected to said addressing register and executing calculation of a next address based on a value held in said addressing register, and an updating unit connected to said addressing register and to said next address calculating unit, and updating the value held in said addressing register based on a calculation result of said next address calculating unit.

3. The data processing device according to claim 2, wherein said addressing register includes a selecting register designating any one of said plurality of address registers; and wherein said control unit directly designates by an instruction field an address register to be referred by an address generator of said plurality of address generators during register indirect addressing, and indirectly designates by the instruction field an address register to be referred by another address generator, based on a value stored in said selecting register.

4. The data processing device according to claim 3, wherein each of said plurality of address generators selects an updating method in accordance with a predetermined precedence when said plurality of address generators have different methods of updating addresses.

5. The data processing device according to claim 3, wherein said data processing unit includes an adder-subtractor having first and second input ports each having a bit width of at least (N+M) bits, N being a bit size of a memory access port accessed by said register indirect addressing and M being a bit size of another memory access port accessed by said register indirect addressing, and receiving data of (N+M) bits read from said one memory access port and said another memory access port and connected together at at least one of said first and second input ports.

6. The data processing device according to claim 2, wherein said data processing unit includes an adder-subtractor having first and second input ports each having a bit width of at least (N+M) bits, N being a bit size of a memory access port accessed and M being a bit size of another memory access port, and receiving data of (N+M) bits read from said one memory access port and said another memory access port and connected together at at least one of said first and second input ports.

7. The data processing device according to claim 6, wherein said data processing unit further includes an accumulator capable of storing data having a bit length of at least (N+M) bits; and wherein said control unit stores into said accumulator the data of (N+M) bits read from said one memory access port and said another memory access port and connected together.

8. The data processing device according to claim 1, wherein said addressing register includes a selecting register designating any one of said plurality of address registers; and wherein said control unit directly designates by an instruction field an address register to be referred by an address generator of said plurality of address generators during register indirect addressing, and indirectly designates by the instruction field an address register to be referred by another address generator, based on a value stored in said selecting register.

9. The data processing device according to claim 8, wherein said data processing unit includes an adder-subtractor having first and second input ports each having a bit width of at least (N+M) bits, N being a bit size of a memory access port accessed by said register indirect addressing and M being a bit size of another memory access port accessed by said register indirect addressing, and receiving data of (N+M) bits read from said one memory access port and said another memory access port and connected together at at least one of said first and second input ports.

10. The data processing device according to claim 9, wherein said data processing unit further includes an accumulator capable of storing data having a bit length of at least (N+M) bits; and wherein said control unit stores into said accumulator the data of (N+M) bits read from said one memory access port and said another memory access port and connected together.

11. The data processing device according to claim 1, wherein said data processing unit includes an adder-subtractor having first and second input ports each having a bit width of at least (N+M bits, N being a bit size of a memory access port and M being a bit size of another memory access port, and receiving data of (N+M) bits read from said one memory access port and said another memory access port and connected together at at least one of said first and second input ports.

12. The data processing device according to claim 11, wherein said data processing unit further includes an accumulator capable of storing data having a bit length of at least (N+M bits; and wherein said control unit stores into said accumulator the data of (N+M) bits read from said one memory access port and said another memory access port and connected together.

13. The data processing device according to claim 1, wherein a part or all of said plurality of address generators each includes a base address register holding a value indicating a base address of said memory system, and a mask field register holding an externally-applied value indicating a specified bit; and wherein said control unit replacing a value of bits, which is indicated by the value held in said mask field register, in an address held in one of said plurality of address registers with the value held in said base address register.

14. The data processing device according to claim 1, wherein a part or all of said plurality of address generators each includes a first register holding a start address, and a second register holding an end address; and wherein said control unit performs modulo addressing based on values held in said first and second registers.

15. The data processing device according to claim 12, wherein said adder-subtractor receives the data of (N+M) bits from said accumulator at at least the other of said first and second input ports.

16. The data processing device according to claim 1, wherein a part or all of said plurality of address generators each include at least one reference registers holding a reference value and is capable of selectively outputting, as an address, a first value stored in one of said plurality of addressing registers as it is and a second value, which is an operation result of an operation on said first value and a value stored in at least one reference register.

* * * * *